United States Patent
Yamamoto (10) Patent No.: US 10,097,548 B2
(45) Date of Patent: Oct. 9, 2018

(54) AUTOMOBILE NETWORK TO COMMUNICATE WITH MULTIPLE SMART DEVICES

(71) Applicant: Xevo Inc., Kirkland, WA (US)

(72) Inventor: Shin Yamamoto, Tokyo (JP)

(73) Assignee: Xevo Inc., Bellevue, WA (US)

( * ) Notice: Subject to any disclaimer, the term of this patent is extended or adjusted under 35 U.S.C. 154(b) by 127 days.

(21) Appl. No.: 14/988,333

(22) Filed: Jan. 5, 2016

(65) Prior Publication Data

US 2017/0195324 A1 Jul. 6, 2017

(51) Int. Cl.
| | |
|---|---|
| H04L 29/06 | (2006.01) |
| H04L 29/08 | (2006.01) |
| H04W 12/06 | (2009.01) |
| H04W 12/08 | (2009.01) |
| H04W 76/02 | (2009.01) |
| H04W 76/14 | (2018.01) |
| H04W 76/15 | (2018.01) |

(52) U.S. Cl.
CPC ........ *H04L 63/0876* (2013.01); *H04L 63/102* (2013.01); *H04L 67/12* (2013.01); *H04L 67/125* (2013.01); *H04L 67/2842* (2013.01); *H04W 12/06* (2013.01); *H04W 12/08* (2013.01); *H04W 76/14* (2018.02); *H04W 76/15* (2018.02)

(58) Field of Classification Search
CPC . H04L 63/0876; H04L 63/102; H04L 67/125; H04L 67/2842; H04W 12/06; H04W 12/08; H04W 76/023; H04W 76/025
USPC .......................................................... 726/4, 5
See application file for complete search history.

(56) References Cited

U.S. PATENT DOCUMENTS

| | | | |
|---|---|---|---|
| 8,751,065 B1 | 6/2014 | Kato | |
| 9,189,607 B1 | 11/2015 | Wick et al. | |
| 9,538,362 B2* | 1/2017 | Allmann | B60R 16/0231 |
| 2006/0061458 A1 | 3/2006 | Simon et al. | |
| 2007/0297606 A1* | 12/2007 | Tkacik | G06F 21/31 380/239 |
| 2008/0133084 A1* | 6/2008 | Weinmann | H04M 1/6083 701/36 |
| 2009/0037034 A1* | 2/2009 | Mattingly | G07C 5/085 701/3 |
| 2012/0083911 A1 | 4/2012 | Louboutin et al. | |
| 2012/0214470 A1 | 8/2012 | Tadayon et al. | |

(Continued)

OTHER PUBLICATIONS

IoT Security Development Framework for building trustworthy Smart car service, Pacheco et al, 0.1109/ISI.2016.7745481, IEEE, Sep. 2016 (Year: 2016).*

(Continued)

*Primary Examiner* — Jahangir Kabir (57) ABSTRACT

Embodiments are directed towards establishing a network between mobile devices, an automobile head unit, and a plurality of automobile accessories. A user utilizes a user interface on a mobile device to send an accessory access request to the head unit. The head unit receives the request and determines if the mobile device is authentic. If authentic, the head unit determines if the mobile device has the proper permissions to perform the requested access of the accessory. If permitted, the head unit generates and sends control commands to the accessory or obtains the requested accessory data and provides it to the mobile device.

15 Claims, 6 Drawing Sheets

(56) References Cited

U.S. PATENT DOCUMENTS

| | | | |
|---|---|---|---|
| 2012/0254948 A1* | 10/2012 | Kleve | H04L 9/3215 |
| | | | 726/4 |
| 2013/0103236 A1 | 4/2013 | Mehrgan | |
| 2013/0257591 A1* | 10/2013 | Nishimura | G05B 11/01 |
| | | | 340/5.72 |
| 2014/0155110 A1 | 6/2014 | Park et al. | |
| 2014/0172197 A1 | 6/2014 | Ganz et al. | |
| 2014/0307655 A1 | 10/2014 | Ricci | |
| 2014/0335902 A1 | 11/2014 | Guba et al. | |
| 2015/0210287 A1 | 7/2015 | Penilla et al. | |
| 2016/0127416 A1* | 5/2016 | Park | H04W 12/08 |
| | | | 726/1 |
| 2016/0164881 A1* | 6/2016 | Bankowski | H04W 4/70 |
| | | | 726/4 |
| 2016/0173548 A1* | 6/2016 | Yang | H04L 65/4092 |
| | | | 709/219 |
| 2016/0295005 A1* | 10/2016 | Schussmann | H04B 1/3822 |

OTHER PUBLICATIONS

Wikipedia, "Bluetooth," retrieved from http://en.wikipedia.org/wiki/Bluetooth, on Mar. 16, 2017, 25 pages.

International Search Report, dated Feb. 24, 2017, for International Application No. PCT/US2016/066709, 17 pages.

\* cited by examiner

AUTOMOBILE NETWORK TO COMMUNICATE WITH MULTIPLE SMART DEVICES

BACKGROUND

Technical Field

The present disclosure relates generally to an automobile head unit, and more particularly, but not exclusively, to providing a network between the head unit, user mobile devices, and accessories of the automobile.

Description of the Related Art

Automobiles are becoming more and more user friendly and interactive. Many new cars are now manufactured with a user interface, called a head unit, which a user can use to control various aspects of the automobile. For example, the user can use the head unit to change radio stations, change the temperature of the automobile cabin, access maps and global positioning systems, and even access the internet. Advancements in short range mobile communications have expanded the experience of the head unit to the user's mobile phone or tablet. Now, users can access music on their smart phone and have it played through the automobile's sound system. But typically only one user at a time can perform these actions, and the types of actions that the user can perform are relatively limited. It is with respect to these and other considerations that the embodiments described herein have been made.

BRIEF SUMMARY

Briefly stated, embodiments are directed towards establishing a network between a plurality of mobile devices, an automobile head unit, and a plurality of automobile accessories. At some point after establishing a connection with a mobile device, the head unit receives a request from the mobile device to access or control a selected accessory in the automobile. The head unit authenticates the mobile device and determines if the mobile device is permitted to interact with the head unit. If the mobile device is authentic, the head unit determines one or more permissions of the user mobile device. These permissions include one or more operations that the user mobile device is authorized to perform with the selected accessory. Based on the permission of the mobile device, the head unit sends control commands to the selected accessory or obtains the requested accessory data and provides it to the mobile device.

Embodiments described herein provide an enhanced network to enable a plurality of mobile devices to interact with and access a plurality of accessories in an automobile without having to directly interact with the accessories. This network also supports various levels of authentication and permission to prohibit or limit some devices from accessing certain accessories, while providing full access to other devices. These permissions can reduce distractions to the driver while also enhancing the automobile user experience for other people in the automobile.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
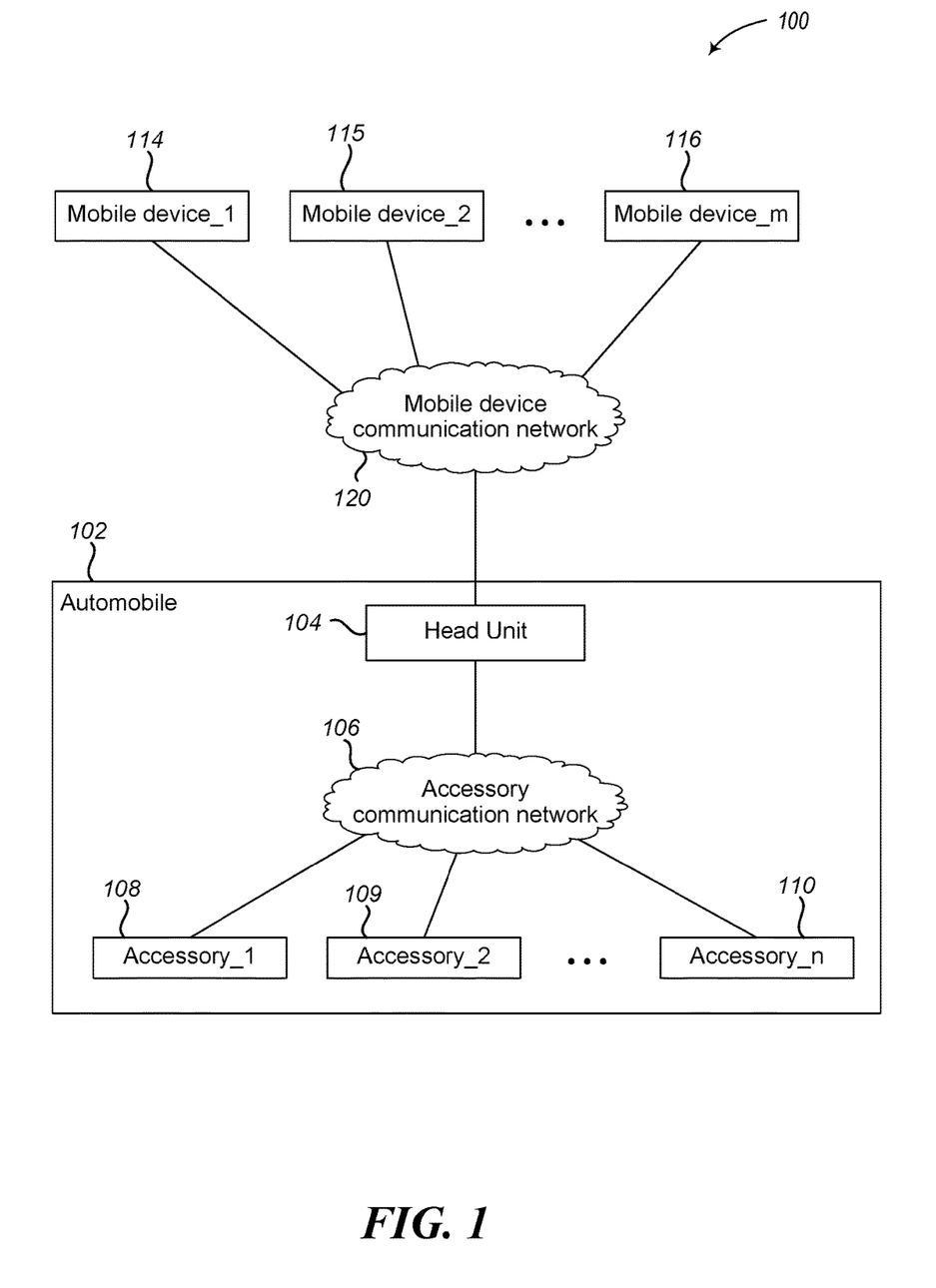
FIG. 1 illustrates a context diagram of an automobile environment for employing an automobile head unit to manage communications between user mobile devices and automobile accessories in accordance with embodiments described herein.

FIG. 1 illustrates a context diagram of an automobile environment for employing an automobile head unit to manage communications between user mobile devices and automobile accessories in accordance with embodiments described herein. System 100 includes an automobile 102 and a plurality of mobile devices 114-116.

The mobile devices 114-116 include any device capable of communicating with a head unit 104 of the automobile 102. The mobile devices 114-116 are structured to send and receive content and controls to and from the head unit 104. Examples of mobile devices 114-116 include, but are not limited to, laptop computers, smart phones, tablet computers, wearable computing devices, other smart devices, or other handheld computing devices.

The automobile 102 is virtually any vehicle that includes a head unit 104. Although this description primarily refers to automobiles, similar embodiments may also be employed in aerial vehicles, water vessels, railroad vehicles, and other modes of transportation that include a head unit and one or more accessories 108-110.

The head unit 104 is a computing device in an automobile that provides interactive controls to a user or occupant of the vehicle. As used herein, the terms user and occupant are interchangeable and refer to any person interacting with the head unit 104, the automobile 102, any of the mobile devices 114-116. The head unit 104 is utilized to control one or more accessories 108-110 or to receive information or data from one or more accessories 108-110. The head unit 104 can display the received accessory data, or it can provide the accessory data to other devices, such as the mobile devices 114-116 or other accessories. The head unit 104 provides various functions, including, but not limited to, connection handling, data binding, data broadcasting, data marshalling, or other data control techniques or functionality to control access between the mobile devices 114-116 and the accessories 108-110. Providing access to an accessory includes obtaining information from the accessory or controlling an operational characteristic of the accessory.

The accessories 108-110 can include any automobile utility or device that is controllable by the user. Examples of these accessories include, but are not limited to, adjustable seats, sun roof, side mirrors, rear-view mirror, air conditioner, power windows, or other controllable features of the automobile 102. Accessories 108-110 also include virtually any automobile utility or device that provides information or data to the user. Examples of these accessories include, but are not limited to, speedometer, odometer, oil pressure gauge, temperature gauge, or other automobile sensors that provides information to a user of the automobile. Accessories 108-110 further include applications executing on the head unit 104 that have two-way interaction with the user. Examples of these accessories include, but are not limited to, navigation, audio and radio controls, television or music applications, environmental control applications, automobile performance or maintenance applications, or other applications. It should be noted that some accessories may only output data, some accessories may only receive controls to manipulate the accessory, and some accessories may input and output data. For example, a speedometer may only output the current speed of the automobile; a power window may only receive controls to move the window up or down, but not return any information to the head unit; and the navigation system may receive controls for a destination and also return a suggested travel route to the destination. It should be noted that these examples are non-exhaustive and other types of accessories may also be employed.

The head unit 104 communicates with the accessories 108-110 via an accessory communication network 106. The accessory communication network 106 is configured to couple the accessories 108-110 with the head unit 104 to transmit content/data between the accessories 108-110 and the head unit 104. The information communicated between devices may include current accessory status or data, accessory control data, video data, voice data, image data, text data, or other types of content, data, or information. The accessory communication network 106 may include one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body communication network, such as a wired controller area network, short range wireless communication network, such as personal area networks utilizing Bluetooth Low Energy protocols, or any other type of network.

The head unit 104 communicates with the mobile devices 114-116 via a mobile device communication network 120. The mobile device communication network 120 is configured to couple the mobile devices 114-116 with the head unit 104 to transmit content/data between the mobile devices 114-116 and the head unit 104. The information communicated between devices may include current accessory status or data, requests to access accessory data, requests to control or modify an accessory, video data, voice data, image data, text data, or other types of content, data, or information. The communication network 120 may include a variety of short range wireless communication networks, such as personal area networks utilizing classic Bluetooth or Bluetooth Low Energy protocols, an IR optical network, or network 120, to enable communication between the mobile devices 114-116 and the head unit 104.

In various embodiments, the mobile device communication network 120 and the accessory communication network 106 are separate communication networks. It should be understood that in various embodiments, the mobile devices 114-116 cannot connect to and communicate directly with the accessories 108-110. The head unit 104 acts as a gateway between the mobile devices 114-116 and the accessories 108-110 to provide authentication and authorization for permitting or restricting the control of accessories 108-110 and the transfer of accessory data, as described herein.

Figure 2A:
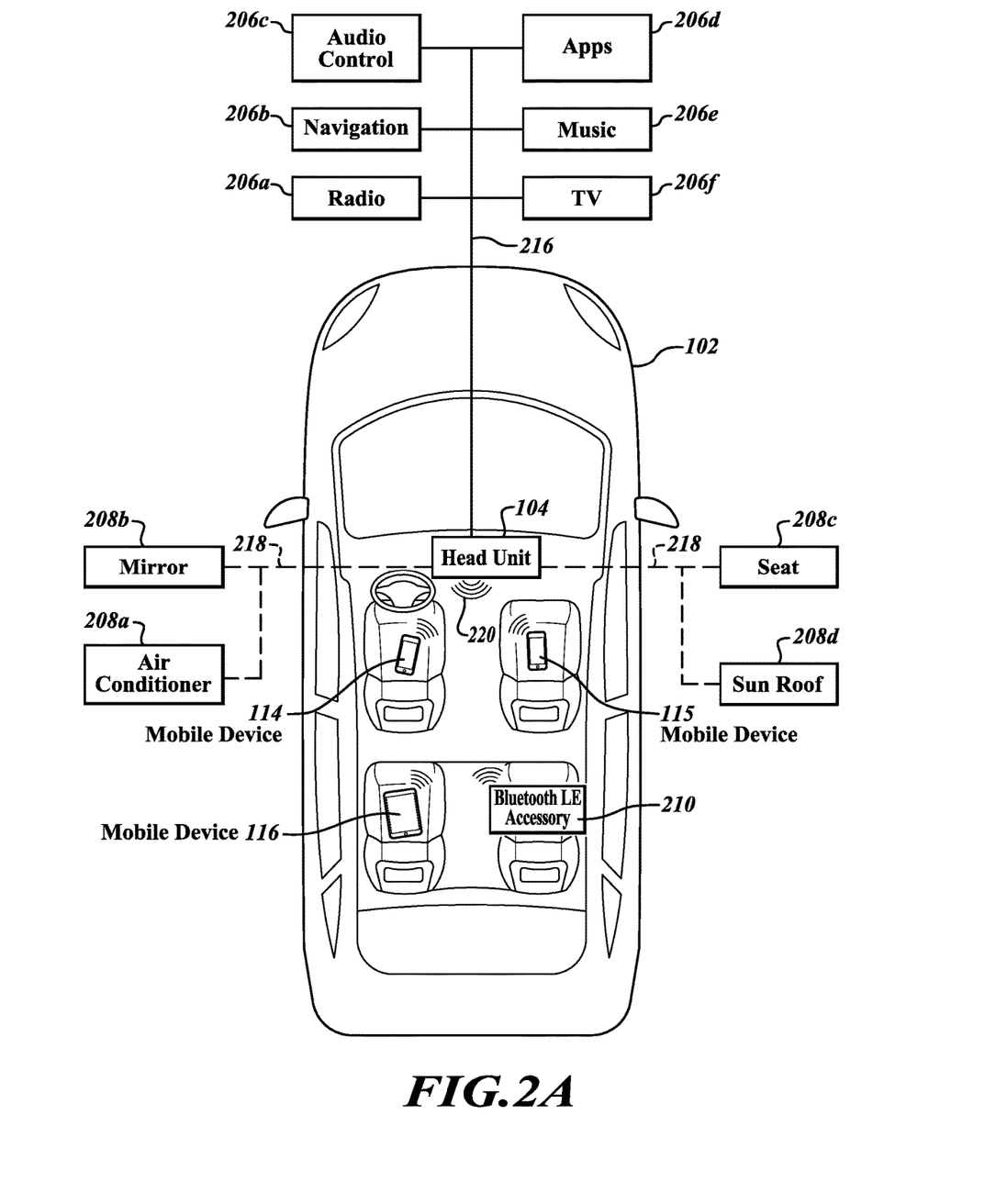
FIGS. 2A-2B show use case examples of an automobile system that includes user mobile devices, a head unit, and various accessories in accordance with embodiments described herein.
Figure 2B:
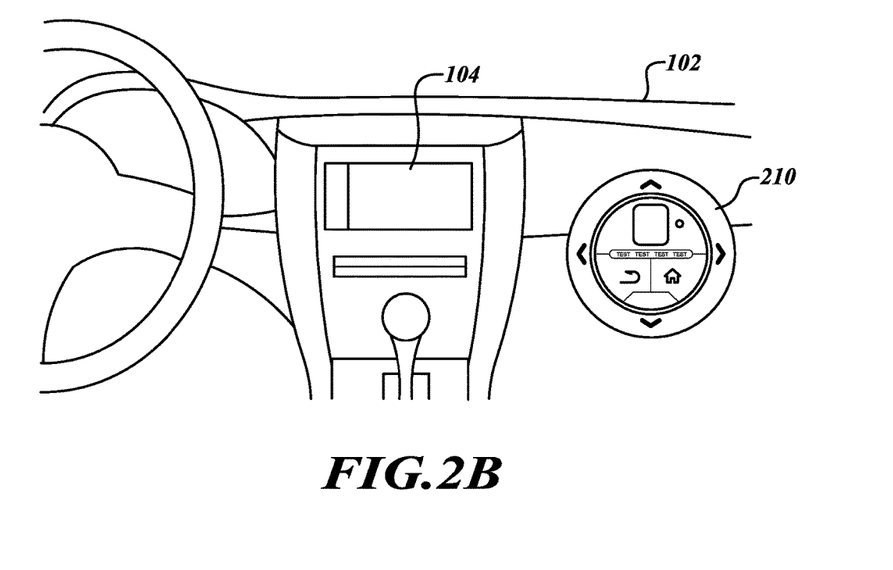

FIGS. 2A-2B show use case examples of an automobile system. The system includes an automobile 102, a head unit 104, and a plurality of different accessories. The illustrated accessories are examples of the accessories 108-110 in FIG. 1. The accessories include body accessories 208a-208d, infotainment accessories 206a-206f, and wireless accessories 210.

The body accessories 208a-208d are accessories that communicate with the head unit 104 via an automotive body communication network 218. The automotive body communication network 218 may be a controller area network bus that physical connects the body accessories 208a-208d to the head unit 104. Examples of body accessories 208a-208d include, but are not limited to, air conditioner 208a, adjustable mirror 208b, adjustable seat 208c, and sun roof 208d.

The infotainment accessories 206a-206f are accessories that are embedded in the head unit 104, such as software programs and functions, and communicate with the head unit 104 via infotainment network 216. The infotainment network 216 may be one or more application program interfaces that enable the head unit 104 to communicate with the various infotainment accessories 206a-206f. Examples of infotainment accessories 206a-206f include, but are not limited to, radio 206a, navigation 206b, audio controls 206c, applications 206d, music 206e, and television 206f.

The wireless accessories 210 include other accessories that communicate with the head unit 104 via a wireless network 220, such as Bluetooth Low Energy or other short range wireless protocol. Although the wireless accessory 210 is illustrated in a back seat of the automobile 102, embodiments are not so limited, and the wireless accessory 210 can be positioned in other locations of the car and may provide control of other accessories.

In various embodiments, the automotive body communication network 218, the infotainment network 216, and the wireless network 220 for communicating with wireless accessory 210 are part of the accessory communication network 106 of FIG. 1.

The mobile devices 114-116 provide requests to the head unit 104 to access or control one or more of the body accessories 208a-208d, the infotainment accessories 206a-206f, the wireless accessories 210, or some combination thereof. In some embodiments, the mobile devices 114-116 can receive accessory data without sending a request to the head unit 104. In such an embodiment, the head unit 104 may obtain accessory data, which is broadcast from the accessory or requested from the accessory by the head unit, and broadcasted or transmitted via wireless network 220. The mobile devices 114-116 can listen for this broadcasted data from the head unit 104.

FIG. 2B illustrates one example of the head unit 104 and an example of the wireless accessory 210 inside the automobile 102. Although the head unit 104 and the wireless accessory 210 are illustrated as being part of the dashboard of the automobile 102, embodiments are not so limited. In this example, the accessory 210 provides an interface for interacting with other accessories. So, instead of using one of mobile devices 114-116, a user can interact with the wireless accessory 210 to control or access the accessories 208a-208d or 206a-206f.

The user activates one or more buttons, scroll wheels, or other interfaces on the wireless accessory 210. In response, the wireless accessory 210 sends a corresponding request to the head unit 104 to access or control one or more accessories. The head unit 104 generates the necessary commands to obtain information from the accessory or to control the accessory, as described herein. The head unit 104 returns obtained accessory data to the wireless accessory 210, some other accessory, or a mobile device 114-116.

The operation of certain aspects of the disclosure will now be described with respect to FIGS. 3 and 4. In at least one of various embodiments, processes 300 and 400 described in conjunction with FIGS. 3 and 4, respectively, may be implemented by or executed on one or more computing devices, such as the head unit 104 of the automobile 102.

Figure 3:
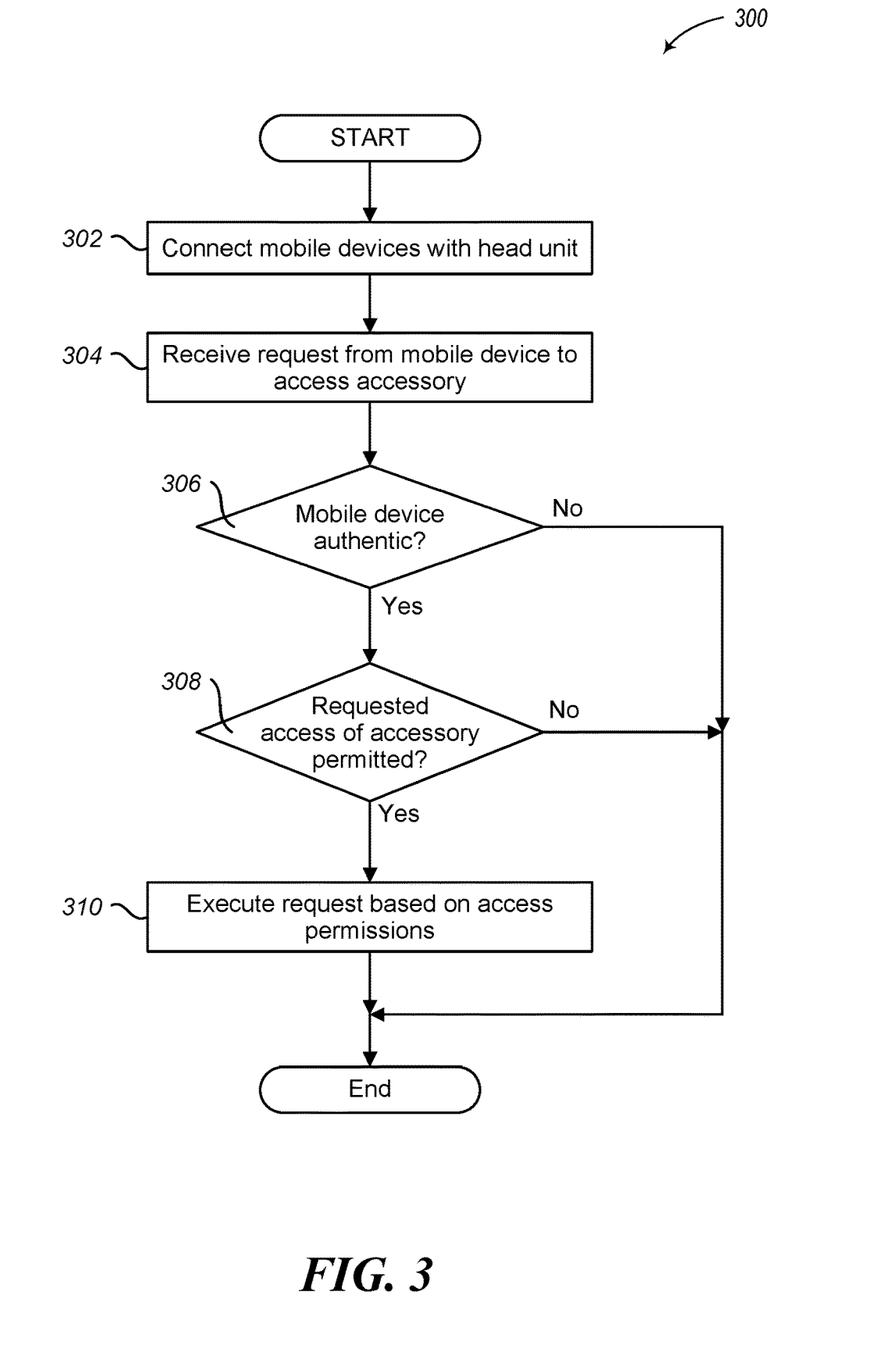
FIG. 3 illustrates a logical flow diagram generally showing one embodiment of an overview process for receiving a request from a user mobile device at a head unit and executing the request in accordance with embodiments described herein.

FIG. 3 illustrates a logical flow diagram generally showing one embodiment of an overview process for receiving a request from a user mobile device at a head unit and executing the request in accordance with embodiments described herein. Process 300 begins, after a start block, at block 302, where one or more user mobile devices are connected to the head unit. The mobile devices may connect to the head unit via one or more networking communication technologies, such as Bluetooth, Bluetooth Low Energy, Wi-Fi, or other short range communication technologies.

Process 300 proceeds to block 304, where a head unit in an automobile receives a request from a mobile device to access an accessory in the automobile. In various embodiments, the mobile device has an application executing on the mobile device. The application provides a user interface for the user to interact with one or more accessories in the automobile via the head unit of the automobile. The user can utilize the user interface to select an accessory to obtain accessory data or to provide commands to an accessory to control the accessory. In one non-limiting example, the user can select the speedometer accessory in the user interface to view the current speed of the automobile. In another example, the user can manipulate temperature controls in the user interface for an environmental control accessory to adjust the cabin temperature. In response to the interactions with the user interface, the mobile phone generates the request, and sends it to the head unit.

Process 300 continues at decision block 306, where a determination is made whether the mobile device is authentic. When the mobile device connects with the head unit at block 302, the head unit and the mobile device may exchange keys, tokens, or other information that is used by the head unit to authenticate the mobile device. The mobile device includes this authentication information with the request. The head unit compares this information with the corresponding authentication information it has stored for the mobile device. It should be understood that other authentication techniques may also be employed to confirm or deny the authenticity of the mobile device.

If the mobile device is authentic, then process 300 flows to decision block 308; otherwise, process 300 terminates or returns to a calling process to perform other actions. In some embodiments, where the mobile device is not authentic, the head unit can send a message to the mobile device indicating that the device has not been authenticated. In other embodiments, the head unit may disregard the request and not notify the mobile device of the unauthentic determination.

If the mobile device is authentic, then process 300 flows from decision block 306 to decision block 308. At decision block 308, a determination is made whether the requested access of the accessory is permitted. In various embodiments, each of a plurality of mobile devices that is connected to, or otherwise registered with, the head unit has various permissions regarding the control and accessibility of each of a plurality of accessories. These permissions may be set by a master mobile device or administrator when the mobile device connects to the head unit or at some other time.

For example, a mother's tablet computer may be a master mobile device with total access and control over the accessories and the permissions of other mobile devices. The mother's daughter's smartphone may only have partial access to a portion, but not all, of the accessories, such as read access of a map function of the navigation accessory and control access to change the radio station. This type of permission restriction allows the master mobile device or administrator to control what the other mobile devices can do. For example, it may be unwise to give the daughter's smartphone permission to turn on the seat warmer for the driver or move the driver's window up and down. But at the same time, allowing the daughter to change the radio channel or even the environmental controls can provide safer driving conditions since the driver does not have to take their eyes off the road or adjust their concentration to change the radio station.

In various embodiments, the head unit stores each mobile device's permissions in a database, which may be local or remote to the head unit. The head unit queries the database for the mobile device, the accessory, and the requested action to determine if the mobile device has the proper permissions. If the requested access is permitted for the mobile device, then process 300 flows to block 310; otherwise, process 300 terminates or returns to a calling process to perform other actions. In some embodiments, where the access is not permitted for that particular mobile device, the head unit can send a message to the mobile device indicating that the device does not have the appropriate permissions to execute the request.

At block 310, the head unit executes the request based on the access permissions of the mobile device, which is described in more detail below in conjunction with process 400 in FIG. 4.

After block 310, process 300 terminates or returns to a calling process to perform other actions.

Although FIG. 3 describes a mobile device sending a request to the head unit, embodiments are not so limited. In other embodiments, the head unit may broadcast or periodically send out accessory data or information, which the mobile device can receive and display to the user. In at least one such embodiment, the data may be encrypted such that only authentic and permitted mobile devices are capable of decrypting and accessing the accessory data. In yet other embodiments, an accessory, such as wireless accessory 210, may send the request to the head unit. In this way, the requesting accessory, rather than a mobile device, can access or control another accessory.

Figure 4:
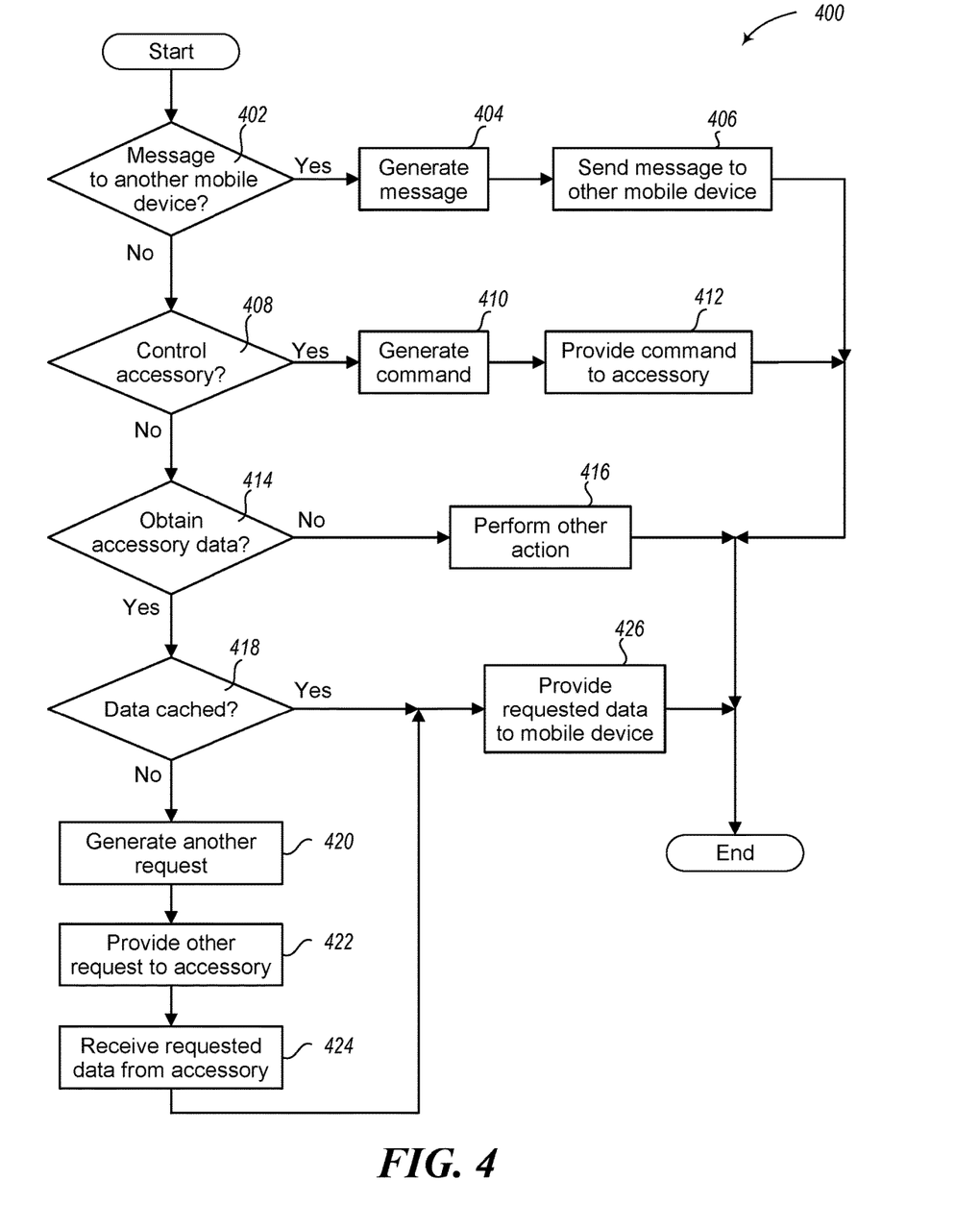
FIG. 4 illustrates a logical flow diagram generally showing one embodiment of a process for executing a request in accordance with embodiments described herein.

FIG. 4 illustrates a logical flow diagram generally showing one embodiment of a process for executing a request in accordance with embodiments described herein. As described above, a request to access or otherwise control an accessory is received at the head unit from a mobile device.

Process 400 begins, after a start block, at decision block 402, where a determination is made whether the received request at block 304 in FIG. 3 is to send a message to another mobile device. This message may be a short text-based message or image-based message. For example, assume the user of the mobile device wants to tell someone else in the car to close his or her window. The user could do this by sending a request to the head unit to forward such a message to the mobile device of the other person. Embodiments, however, are not so limited. In another example, the user wants to tell a friend where they are currently located. In this case, the user can send a request to the head unit to obtain the automobile's current position from the navigation accessory and send it to the friend's mobile device. If the request is to message another mobile device, then process 400 flows to block 404; otherwise, process 400 flows to decision block 408.

At block 404, the head unit generates a message based on the request. In some embodiments, the head unit repackages the request into a different format or transmission protocol, or performs some other modification, necessary to send the requested message to the other mobile device. In other embodiments, the head unit performs other actions to obtain information for inclusion in the generated message. For example, the request may be to inform the other device of the current location of the automobile. In this example, the head unit obtains the GPS coordinates of the automobile from the navigation accessory and generates a message with the obtained information.

Process 400 proceeds to block 406, where the message is sent to the other mobile device. In various embodiments, the message is sent to the other mobile device via Bluetooth Low Energy protocols, or some other localized communication networking standard. In other embodiments, the message is sent to the other mobile device over a more robust communication network, such as a cellular network. For example, in some embodiments, the mobile device, such as a tablet, may not have access to a cellular network, but the head unit does. The head unit can receive the message from the tablet, generate an SMS message at block 404 and send the SMS message to the other mobile device via the head unit's cellular network access. In this way, users inside the automobile can communicate with others that are not in the automobile.

After block 406, process 400 terminates or returns to a calling process to perform other actions. In some embodiments, the request received from the mobile device may include multiple requests or actions, and process 400 may loop, not illustrated, to decision block 402 to further process the request.

If, at decision block 402, the request is not to message another mobile device, then process 400 flows from decision block 402 to decision block 408. At decision block 408, a determination is made whether the request is to control an accessory in the automobile. The request may include a generic command and an identifier for the accessory to apply that command. For example, the request may indicate the environmental controls accessory and an increase command. In another example, the request may indicate the dome light accessory and an "on" or toggle command. In various embodiments, it may be necessary for the head unit and the mobile device to coordinate or synchronize the accessories and their controllable features. This synchronization may occur when the mobile device connects with the head unit, when new accessories are added or modified, or at other times. This coordination allows the mobile device to send requests that can be understood by the head unit.

If the request is to control an accessory, then process 400 flows to block 410; otherwise, process 400 flows to decision block 414.

At block 410, the head unit generates a command to send to the accessory. The head unit can utilize a lookup table or other database to generate one or more commands to control the accessory based on the received request. In various embodiments, the command is generated specifically for the accessory based on the type of accessory and the communication network utilized to communicate with that accessory. The command includes an identifier of the accessory and an instruction to control the accessory. The head unit generates the command to be in a format, protocol, or other electronic signal that is recognized by the accessory, such that the accessory can perform an action in accordance with the requested control. For example, the request may be to move the passenger's window down. The head unit generates a command that identifies the passenger power window accessory and can be put on the automotive body communication network such that the power window accessory receives the command and activates a motor to move the window. It should be understood that different accessories on different communication networks utilize different commands.

Process 400 proceeds to block 412, where the head unit provides the command to the accessory. The communication network utilized to send the command to the accessory may be dependent on the type of accessory or the connection between the accessory and the head unit. For example, if the command is to move a window up or down, the head unit can utilize an automotive body communication network, such as a controller area network within the automobile. As another example, the command is to control the navigation accessory, such as to enter a destination. In this case, the head unit can utilize an application program interface or other software-related tool to provide the destination provided by the mobile device to the navigation accessory. In yet another embodiment, Bluetooth Low Energy may be utilized to send commands to a wireless accessory, such as a wireless heads-up display accessory.

After block 412, process 400 terminates or returns to a calling process to perform other actions. In some embodiments, the request received from the mobile device may include multiple requests or actions, and process 400 may loop, not illustrated, to decision block 402 to further process the request.

If, at decision block 408, the request is not to control an accessory, then process 400 flows from decision block 408 to decision block 414. At decision block 414, a determination is made whether the request is to obtain accessory data. In some embodiments, the request may identify an accessory, the type of data to be obtained, or an instruction to send to the accessory to cause the accessory to return data. If the request is to obtain accessory data, then process 400 flows to decision block 418; otherwise, process 400 flows to block 416 to perform other actions.

At block 416, the head unit performs other actions, which may include sending a notification to the mobile device that the head unit is unable to process the request, updating a user profile, changing mobile device permissions or authentication status, etc. After block 416, process 400 terminates or returns to a calling process to perform other actions.

If, at decision block 414, the request is to obtain accessory data, then process 400 flows from decision block 414 to decision block 418. At decision block 418, a determination is made whether the requested accessory data is currently cached by the head unit. In some embodiments, some accessories may periodically broadcast or send information to the head unit without the mobile device or the head unit requesting the information. The accessories can send this information at regular time intervals or when the information is updated or changed. The head unit caches this information until it is updated, changed, or for a predetermined amount of time.

In other embodiments, the head unit may obtain and cache accessory information without being requested by the mobile device. The head unit may utilize various prediction algorithms to pre-fetch and cache accessory data. For example, the head unit may obtain the current cabin temperature of the automobile if the user of the mobile device frequently requests the temperature.

If the data is cached at the head unit, then process 400 flows to block 426; otherwise, process 400 flows to block 420.

At block 420, the head unit generates another request to be sent to the accessory requesting the data. Block 420 may employ embodiments similar to those described in conjunction with block 410, but the generated request is a query instruction sent to the accessory to obtain information from the accessory.

Process 400 proceeds to block 422, where the other request is provided to the accessory. Block 422 may employ embodiments similar to those described in conjunction with block 412, but where the other request is to obtain information from the accessory, rather than control some aspect of the accessory. For example, the head unit may provide the other request to the accessory via the automotive body communication network, an application program interface, Bluetooth Low Energy, or some other communication network utilized to send communications between the head unit and the accessory.

Process 400 continues at block 424, where the head unit receives the requested data from the accessory. In some embodiments, the head unit stores or caches the requested data for a predetermined amount of time.

After the head unit obtains the data from the accessory at block 424, or if the head unit currently has the data cached in its memory, then process 400 proceeds to block 426. At block 426, the head unit provides the requested data to the mobile device via the mobile device communication network. In various embodiments, the head unit repackages the request into a different format or transmission protocol, or performs some other modification, necessary to send the requested data to the mobile device.

As described elsewhere herein, the head unit may broadcast or periodically transmit accessory data without receiving a request from a mobile device. In some embodiments, the data is broadcast when it changes or at predetermined time periods. Broadcasting of accessory data enables mobile devices to receive data updates or changes without having to actively send requests to the head unit, which can be received by the mobile device.

After block 426, process 400 terminates or returns to a calling process to perform other actions. In some embodiments, the request received from the mobile device may include multiple requests or actions, and process 400 may loop, not illustrated, to decision block 402 to further process the request.

As mentioned above, an accessory may send the request to the head unit rather than the mobile device. In such embodiments, processes 300 and 400 are performed but with the requesting device being an accessory rather than the mobile device. Similarly, the head unit provides requested accessory data to the requesting accessory rather than the mobile device.

It should be understood that the embodiments described in the various flowcharts may be executed in parallel, in series, or in a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Figure 5:
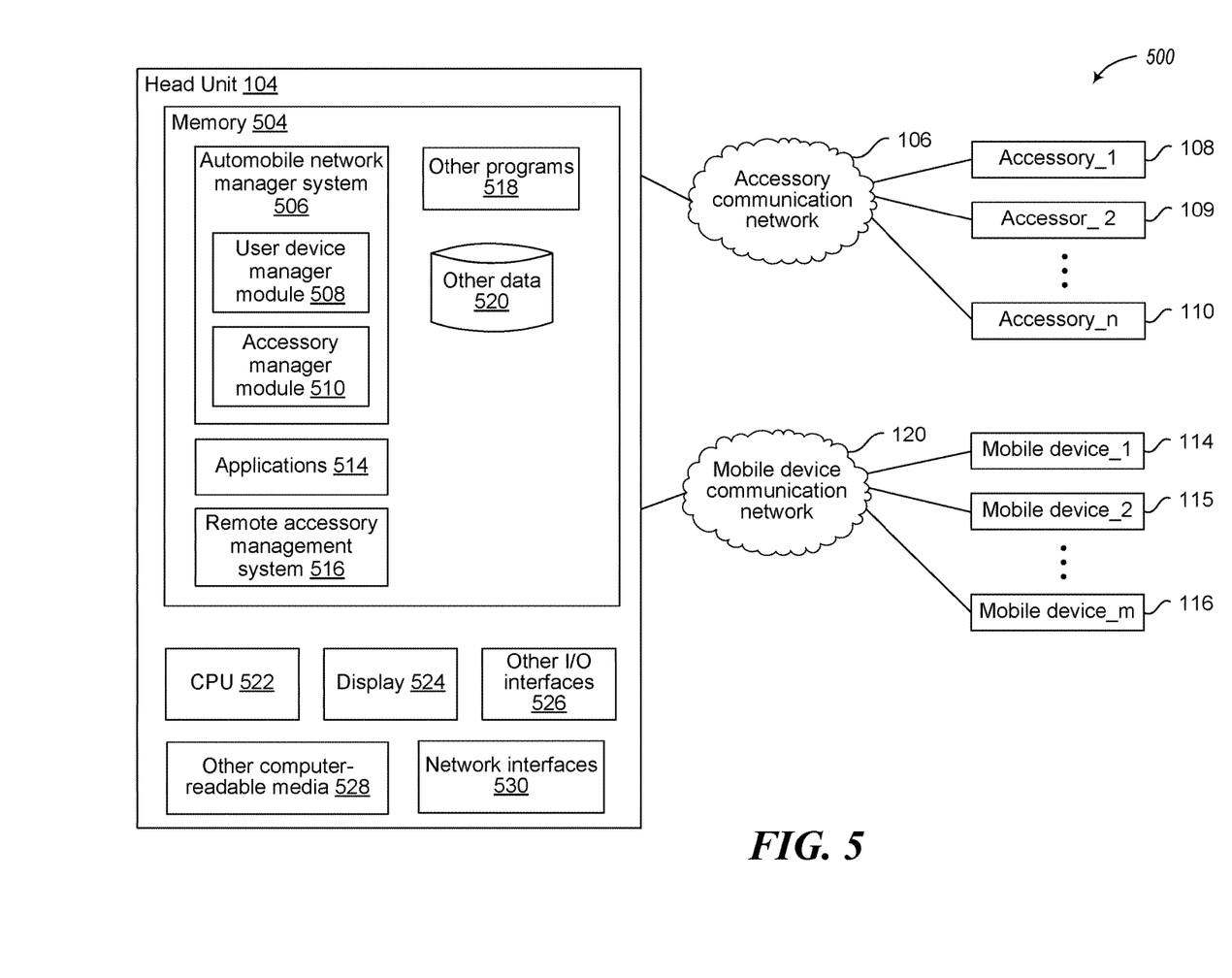
FIG. 5 shows a system diagram that describes one implementation of computing systems for implementing embodiments described herein.

FIG. 5 shows a system diagram that describes one implementation of computing systems for implementing embodiments described herein. System 500 includes head unit 104, accessories 108-110, and mobile devices 114-116. Head unit 104 communicates with accessories 108-110 via accessory communication network 106, and communicates with mobile devices 114-116 via mobile device communication network 120, as described herein.

One or more special-purpose computing systems is used to implement head unit 104 to provide easy pairing and connection between the head unit 104 and the mobile devices 114-116. Accordingly, various embodiments described herein may be implemented in software, hardware, firmware, or in some combination thereof.

Head unit 104 includes memory 504, one or more central processing units (CPUs) 522, display 524, I/O interfaces 526, other computer-readable media 528, and network interface 530.

Memory 504 may include one or more various types of non-volatile and/or volatile storage technologies. Examples of memory 504 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 504 may be utilized to store information, including computer-readable instructions that are utilized by CPU 522 to perform actions, including embodiments described herein.

Memory 504 may have stored thereon automobile network manager system 506, which includes user device manager module 508 and accessory manager module 510. User device manager module 508 may employ embodiments described herein to communicate with one or more of mobile devices 114-116. User device manager module 508 can receive command requests from the mobile devices 114-116 to control accessories 108-110 and can send accessory data and information to the mobile devices 114-116. Accessory manager module 508 can receive accessory data and information from accessories 108-110 and send command requests to control accessories 108-110.

Memory 504 may also store other programs 518 and other data 520. Other data 520 may store various authentication and permission information for the mobile devices 114-116, cached accessory data and information, or other head unit data. The other data 520 may also store other data associated with the various accessories 108-110. For example, the other data 520 may store music playlists or radio station favorites, map waypoints, user contact information, user preferences for heads-up-display information and layout, etc.

Memory 504 also stores applications 514 and remote accessory management system 516. Applications 514 include various software related programs that are accessible to a user on the head unit 104. Applications 514 may include one or more accessories. These accessories may include, for example, navigation applications, radio and audio applications, automobile environmental controls applications, automobile performance or maintenance applications, or other automobile related applications.

Remote accessory management system 516 interacts with one or more of accessories 108-110 via accessory communication network 106. The remote accessory management system 516 may interact with a controller area network, Bluetooth network, or other automotive communication system to send information or requests to the accessories 108-110 or to receive information from the accessories 108-110.

Display 524 is a display device capable of rendering content or information to a user. For example, display 524 may display maps, radio station information, applications, environmental controls for the automobile, other user interfaces, etc. The display 524 may be a liquid crystal display, light emitting diode, or other type of display device, and include a touch sensitive screen capable of receiving inputs from a user's hand, stylus, or other object.

I/O interfaces 526 may include interfaces for various other input or output devices, such as audio interfaces, other video interfaces, USB interfaces, or the like.

Other computer-readable media 528 may include other types of stationary or removable computer-readable media, such as removable flash drives, external hard drives, or the like.

Network interface 530 is configured to communicate with other computing devices, such as mobile devices 114-116 via mobile communication network 120 or accessories 108-110 via accessory communication network 106.

The various embodiments described above can be combined to provide further embodiments. All of the U.S. patents, U.S. patent application publications, U.S. patent applications, foreign patents, foreign patent applications and non-patent publications referred to in this specification or listed in the Application Data Sheet are incorporated herein by reference, in their entirety. Aspects of the embodiments can be modified, if necessary, to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, executing on a head unit of an automobile, to network user mobile devices and accessories in the automobile, comprising:
    establishing, by the head unit, a network connection with each of a plurality of user mobile devices;
    storing, by the head unit and for each corresponding user mobile device of the plurality of user mobile devices, first authentication information and a separate permission for the corresponding user mobile device to access each of a plurality of accessories within the automobile;
    receiving, by the head unit, a first request from a first user mobile device of the plurality of user mobile devices to access a selected accessory of the plurality of accessories within the automobile to provide data from the selected accessory to a second user mobile device of the plurality of user mobile devices, wherein the first request includes second authentication information for the first user mobile device;
    determining, by the head unit, the first user mobile device is authentic based on a comparison of the second authentication information with the first authentication information;
    in response to the first user mobile device being authentic, determining, by the head unit, the first user mobile device is permitted to access the selected accessory and send data from the selected accessory to the second user mobile device; and
    executing, by the head unit and in response to the first user mobile device being permitted to access the selected accessory, an action in response to the first request, including:
    sending, by the head unit, a second request to the selected accessory for data in response to the first request received from the first user mobile device;
    receiving, by the head unit, a response from the selected accessory with the requested data; and
    providing, by the head unit, the requested data to the second user mobile device.

2. The method of claim 1, wherein executing the action in response to the first request further includes:
    caching data from the selected accessory prior to receiving the first request from the first user mobile device; and
    providing the cached data to the second user mobile device in response to receiving the first request.

3. The method of claim 1, wherein executing the action in response to the first request further includes:
    generating a command to control an operating parameter of the selected accessory based on the first request; and
    sending the command to the selected accessory for execution by the selected accessory.

4. The method of claim 1, wherein providing the requested data to the second user mobile device includes:
generating a message for the second user mobile device to include the requested data; and
sending the message to the second user mobile device via a cellular network.

5. The method of claim 1, wherein the selected accessory is one of an automobile body accessory, an infotainment accessory, or a wireless accessory.

6. A head unit of an automobile, comprising:
a memory for storing instructions; and
a processor that executes the instructions to:
establish a network connection with each of a plurality of user mobile devices;
store, for each corresponding user mobile device of the plurality of user mobile devices, first authentication information and a separate permission for the corresponding user mobile device to access each of a plurality of accessories within the automobile;
receive a first request from a first user mobile device of the plurality of user mobile devices to access a selected accessory of the plurality of accessories within the automobile to provide data from the selected accessory to a second user mobile device of the plurality of user mobile devices, wherein the first request includes second authentication information for the first user mobile device;
determine the first user mobile device is authentic based on a comparison of the second authentication information with the first authentication information;
in response to the first user mobile device being authentic, determine the first user mobile device is permitted to access the selected accessory and send data from the selected accessory to the second user mobile device; and
execute, in response to the first user mobile device being permitted to access the selected accessory, an action in response to the first request, including:
send a second request to the selected accessory for data in response to the first request received from the first user mobile device;
receive a response from the selected accessory with the requested data; and
provide the requested data to the second user mobile device.

7. The head unit of claim 6, wherein the execution of the action in response to the first request includes the processor executing further instructions to:
cache data from the selected accessory prior to receiving the first request from the first user mobile device; and
provide the cached data to the second user mobile device in response to receiving the first request.

8. The head unit of claim 6, wherein the execution of the action in response to the first request includes the processor executing further instructions to:
generate a command to control an operating parameter of the selected accessory based on the first request; and
send the command to the selected accessory for execution by the selected accessory.

9. The head unit of claim 6, wherein providing the requested data to the second user mobile device includes:
generate a message for the second user mobile device to include the requested data; and
send the message to the second user mobile device via a cellular network.

10. The head unit of claim 6, wherein the selected accessory is one of an automobile body accessory, an infotainment accessory, or a wireless accessory.

11. A system, comprising:
a plurality of accessories of an automobile; and
a head unit of the automobile, the head unit including:
a memory for storing instructions; and
a processor that executes the instructions to:
establish a network connection with each of a plurality of user mobile devices;
store, for each corresponding user mobile device of the plurality of user mobile devices, first authentication information and a separate permission for the corresponding user mobile device to access each of the plurality of accessories;
receive a first request from a first user mobile device of the plurality of user mobile devices to access a selected accessory of the plurality of accessories within the automobile to provide data from the selected accessory to a second user mobile device of the plurality of user mobile devices, wherein the first request includes second authentication information for the first user mobile device;
determine the first user mobile device is authentic based on a comparison of the second authentication information with the first authentication information;
in response to the first user mobile device being authentic, determine the first user mobile device is permitted to access the selected accessory and send data from the selected accessory to the second user mobile device; and
execute, in response to the first user mobile device being permitted to access the selected accessory, an action in response to the first request, including:
send a second request to the selected accessory for data in response to the first request received from the first user mobile device;
receive a response from the selected accessory with the requested data; and
provide the requested data to the second user mobile device.

12. The system of claim 11, wherein the execution of the action in response to the first request includes the processor executing further instructions to:
cache data from the selected accessory prior to receiving the first request from the first user mobile device; and
provide the cached data to the second user mobile device in response to receiving the first request.

13. The system of claim 11, wherein the execution of the action in response to the first request includes the processor executing further instructions to:
generate a command to control an operating parameter of the selected accessory based on the first request; and
send the command to the selected accessory for execution by the selected accessory.

14. The system of claim 11, wherein providing the requested data to the second user mobile device includes:
generate a message for the second user mobile device to include the requested data; and
send the message to the second user mobile device via a cellular network.

15. The system of claim 11, wherein the selected accessory is one of an automobile body accessory, an infotainment accessory, or a wireless accessory.

* * * * *